April 1, 1952 W. S. GURTON ET AL 2,590,962
DETACHABLE DOLLY AND TRAILER
Filed Sept. 12, 1947 2 SHEETS—SHEET 1
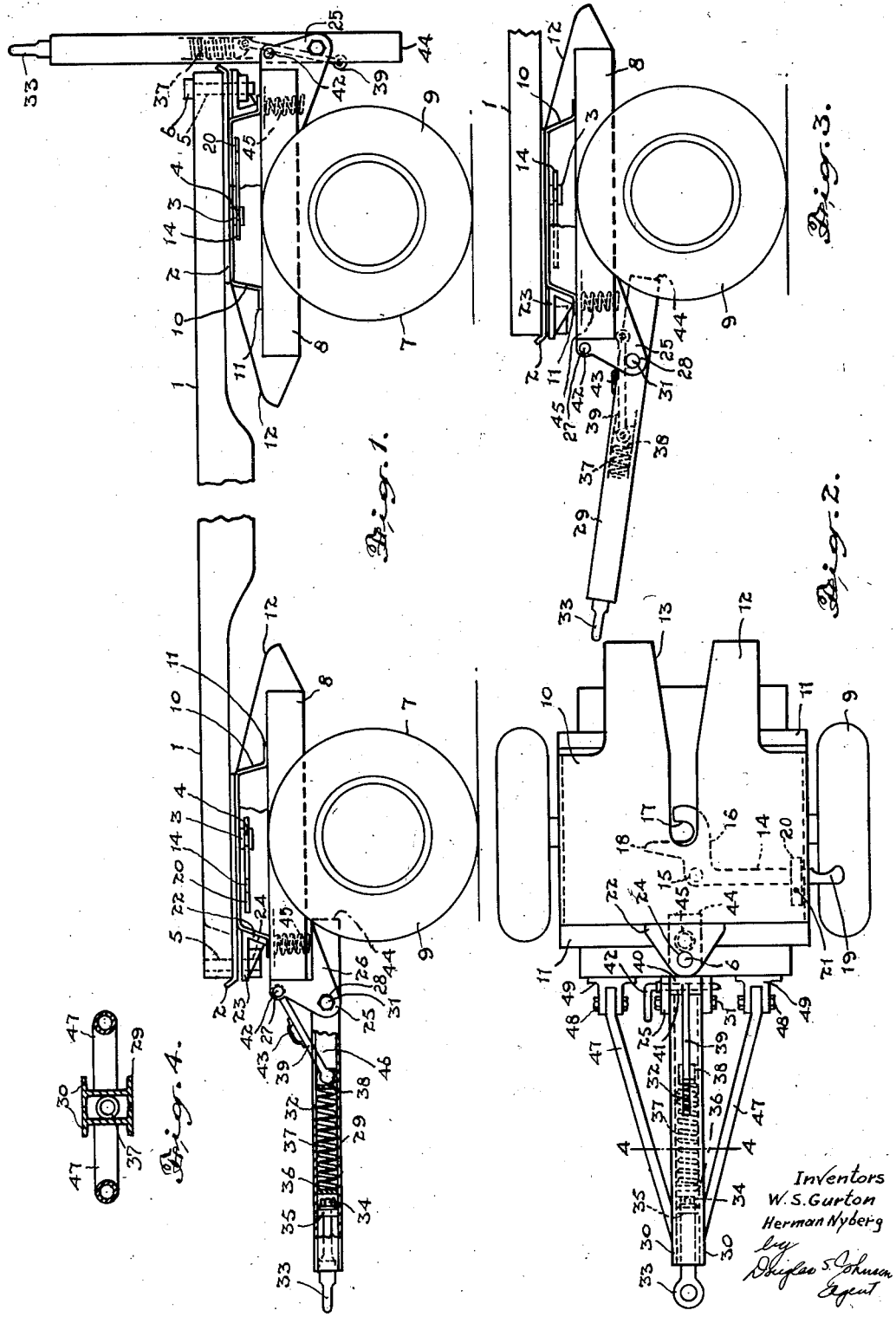

April 1, 1952     W. S. GURTON ET AL     2,590,962
DETACHABLE DOLLY AND TRAILER
Filed Sept. 12, 1947     2 SHEETS—SHEET 2
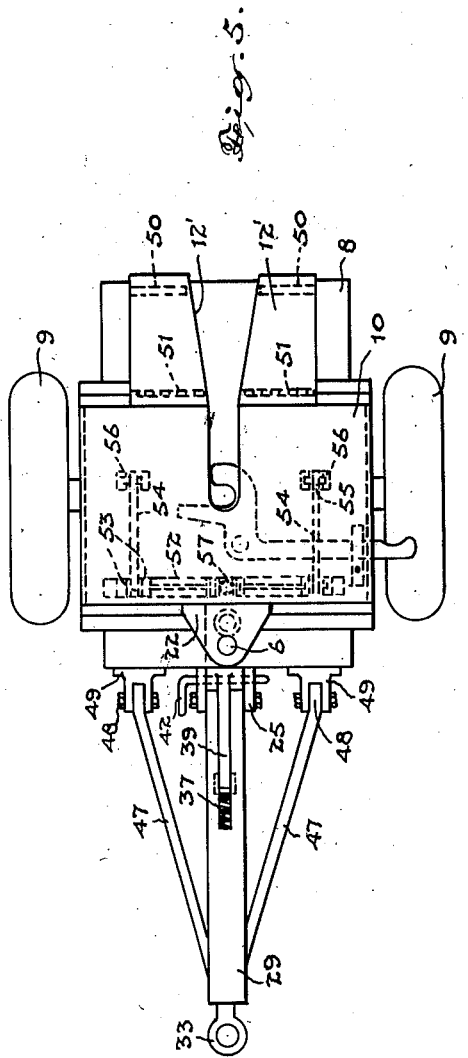
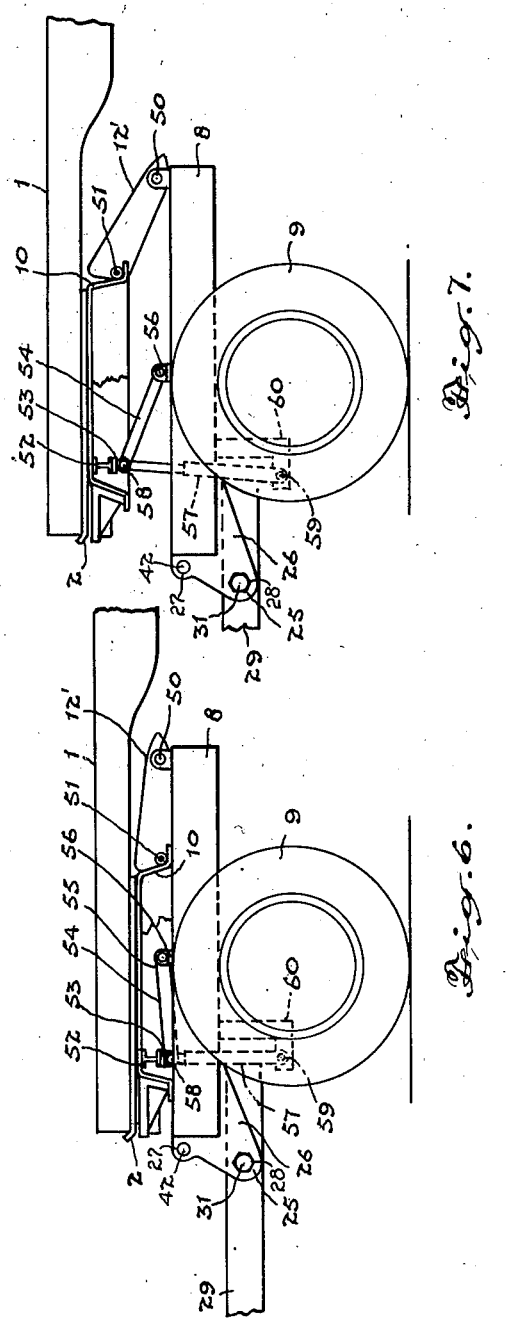
Inventors
W. S. Gurton
Herman Nyberg
by Douglas S. Johnson
Agent Patented Apr. 1, 1952

2,590,962

UNITED STATES PATENT OFFICE 2,590,962

DETACHABLE DOLLY AND TRAILER

William S. Gurton and Herman Nyberg, Kitchener, Ontario, Canada, assignors, by mesne assignments, to Brantford Coach and Body Limited, Brantford, Ontario, Canada Application September 12, 1947, Serial No. 773,566

13 Claims. (Cl. 280—33.5)

This invention relates to tractor drawn trailers for hauling goods and raw materials, and the principal object of the invention is to provide an extremely convenient form of detachable dolly trailer unit adapted particularly for use in pulpwood woodland and similar operations, which unit will have a short turning radius and can be readily drawn by either end, eliminating the necessity of turning the trailer in restricted quarters and which will incorporate detachable, interchangeable dollies to enable the bare frame to be spotted at remote points during the loading period to permit the dollies to be used with other trailer frames, thus reducing to a minimum the equipment tied up during the loading and unloading operations.

A further and important object is to provide a novel form of detachable dolly which will be extremely easy and safe to handle when connecting to the trailer frame and which will automatically be adjusted during connection to compensate for the height of the draft vehicle or the slope of the trailer frame during attachment.

A still further and important object is to provide a detachable dolly which when connected to the trailer frame can be locked against rotation to form the rear dolly support or alternatively can be adjusted to form the lead dolly for connection to the draft vehicle to permit the trailer unit to be readily drawn by either end.

A further and very important object is to provide a novel form of detachable dolly which will incorporate hydraulic means for raising and lowering the trailer frame to enable the frame to be lifted and blocked up to permit the dolly to be readily detached therefrom.

The principal feature of the invention consists in providing a trailer unit comprising a trailer frame having identical upper fifth wheel plates and king pins at each end thereof and providing a pair of identical novel detachable dollies having fifth wheels adapted to fit up with the king pins and fifth wheel plates of the frame, the dollies being provided with drawbars for selective connection to the draft vehicle to enable the trailer unit to be drawn by either end, and means carried by the trailer frame for locking the dolly not connected to the draft vehicle from rotation relative its connecting king pin.

A further and very important feature consists in providing a novel form of detachable trailer dolly having a rigid fifth wheel for connection to a fifth wheel of a trailer frame and a drawbar, and having means for resiliently holding said drawbar with a desirable degree of stiffness in a substantially horizontal position to facilitate the connecting up of the dolly to the trailer frame, the drawbar holding means being readily disconnected to permit free hinging movement of the draw bar in the event the draw bar is to be utilized to draw the trailer, and means for locking the draw bar in an inoperative position in the event the trailer is to be drawn by the opposite end.

A still further important feature consists in providing a detachable trailer dolly in which the fifth wheel carried thereby for connection to the trailer frame is supported by a parallel link arrangement to permit vertical movement of the fifth wheel with the trailer contacting face thereof maintained in a horizontal position, and hydraulic means are provided to enable said fifth wheel to be raised and lowered.

With reference to the accompanying drawings,

Figure 1 is an elevational view of a trailer unit incorporating our novel form of detachable dolly with the draw bar of the forward dolly shown partly in section thus illustrating the manner in which the draw bar can be held relatively stiffly in a resilient horizontal position while the draw bar of the rearward dolly is shown in the upright locked position.

Figure 2 is a plan view of our detachable dolly.

Figure 3 is an elevational view of one embodiment of our dolly.

Figure 4 is a sectional view taken on the line 4—4 of Figure 2 illustrating the construction of the draw bar of the dolly shown in Figure 2.

Figure 5 is a plan view similar to Figure 2, illustrating a further embodiment of our dolly wherein the fifth wheel is shown supported for vertical movement.

Figure 6 is an elevational view of the dolly illustrated in Figure 5 and showing the fifth wheel in the lowered position.

Figure 7 is a view similar to Figure 6 but showing the fifth wheel in the raised position.

In the past where detachable dolly units have been used with trailers the dolly has been adapted to connect with one end of the trailer frame so that the trailer could only be drawn by one end. Usually the trailer frame is supported at one end on a fixed truck or carriage, the cost of which is a considerable proportion of the total cost of the trailer unit. Such arrangements have many serious disadvantages in that a considerable amount of expensive equipment is tied up during the loading and unloading operations of the trailer, and further, the necessity of drawing the trailer by one end presents an extremely difficult problem of turning the trailer, particularly in rough and difficult terrain such as is encountered for example, in pulpwood and logging operations where narrow rough trails are hewn through the bush.

One of the aspects of this invention is to overcome the above difficulties by providing an arrangement whereby the trailer unit can be drawn at either end and the bare trailer frame can be blocked up or spotted at the desired loading point to permit the dollies used in supporting the frame during transit to be utilized with other trailer frames.

Another aspect of the invention is not only to provide an extremely convenient and inexpensive form of trailer unit but to provide a dolly which will be readily connected to or removed from the trailer frame and will be extremely safe and easy to handle to overcome the difficulties previously encountered with the old types of dollies which were both awkward and dangerous to handle.

Further advantages of our dolly structure will be apparent from the following description.

With reference to the accompanying drawings, we show in Figure 1 a trailer body 1, which of course may be of any desired shape or construction, and adjacent each end of the trailer body on the underside thereof is an upper fifth wheel member 2 and a downwardly projecting king pin 3 formed with an annular groove 4.

Extending through the trailer body at each end thereof adjacent the centre line is an opening 5 adapted to receive a lock pin 6, the purpose of which will hereinafter appear.

Supporting the trailer body 1 at each end thereof is an identical detachable dolly, generally referred to as 7. Each of these dollies comprises a substantially horizontal frame 8, often referred to as the sub-frame, which is suitably supported on wheels 9, and mounted on the frame 8 is a fifth wheel member 10 which, as shown in Figures 1, 2 and 3, is rigidly secured thereto along the flange portions 11.

Extending rearwardly from the fifth wheel member is a downwardly extending ramp 12 which is provided with a longitudinal slot 13 tapering inwardly from the rearward edge thereof and extending to adjacent the centre of the fifth wheel member 10.

In attaching or hitching the dolly to the trailer body or frame the dolly is backed under the trailer with the king pin 3 entering the slot 13 in the ramp 12, and as the dolly is moved rearwardly the upper fifth wheel member 2 of the trailer body slides up the ramp and into engagement with the fifth wheel member 10 of the dolly until the king pin 3 contacts the end of the slot 13.

A locking lever 14 pivoted at 15 and provided with a right-angularly extending head portion 16 is adapted to close the slot 13 against removal of the king pin and is provided with a U-shaped notch in the head portion 16 to receive the king pin 3 with the edge of the notch 17 engaging the annular groove 4 thereof.

At the inner side of the notch 17 the head 16 is continued out to form an outstanding leg portion 18 to facilitate the locking and unlocking effect of the lever.

A lever handle 19 extends through a guide 20 and a suitable locking pin 21 maintains the lever from movement in its guide.

Secured to the front of the fifth wheel member 10 adjacent the centre is a bracket 22 having a forwardly extending tongue portion 23 formed with an orifice 24 therein which is adapted to register with the opening 5 in the trailer body to receive the lock pin 6 to prevent the dolly from rotating about its connection as provided between the locking lever 14 and the king pin 3 and the fifth wheel members 2 and 10.

Mounted on the forward end of the dolly frame 8 are spaced angle members 25 having a rearwardly extending leg portion 26 secured to the underside of the frame 8. Aligned openings 27 are provided in the members 25 adjacent the top while larger aligned openings 28 forming bearing bosses are arranged in the members 25 below the openings 27.

A drawbar 29 formed of two I-beams 30 with the edge of their webs welded together to form a hollow beam as illustrated in Figure 4, is pivotally secured adjacent one end by means of a suitable bolt 31 passing through the draw bar and through the openings 28 of the members 25.

The upper edge of the draw bar is provided with a longitudinal slot 32 providing communication into the interior thereof, and arranged in the outward end of the draw bar is a suitable eye-bolt 33 which may be cushioned as desired, the eye-bolt being held in place by a nut 34 secured to its inner end which passes through a fixed plate 35.

Arranged in the interior of the draw bar 29 is a solid stop plate 36, and secured at one end to the stop plate is a heavy coiled spring 37, the opposite end of which is secured to a slide or block 38 slidably mounted in the draw bar. The spring 37 is adapted to be in a natural unstrained state with the draw bar horizontal as shown in Figure 1.

Pivotally secured to the slide 38 is a rigid rod 39 which extends upwardly through the slot 32 in the draw bar, the upper end 40 thereof being enlarged and having an opening therethrough as indicated at 41.

The end 40 of the rod 39 is adapted to enter between the members 25 to receive a removable lock pin 42 adapted to extend through the aligned openings 27 of the members 25 and through the opening 41 of the rod to pivotally secure the end thereof to the dolly frame 8. A handle 43 is secured to the rod 39 for convenience in moving same during handling of the draw bar.

The inner end 44 of the draw bar extends beneath the frame 8 and secured on the underside of this frame 8 is a heavy compression spring 45 which extends downwardly and engages the draw bar end 44 to provide a resilient connection between the draw bar and the dolly frame to resiliently resist the downward movement of the forward end of the draw bar.

It will be seen from Figure 1 that with the end 40 of the rod 39 pivotally secured to the dolly frame 8 by means of the removable lock pin 42, the draw bar will then be held resiliently and relatively stiffly in a substantially horizontal position with upward movement thereof firmly resisted by the coil spring 37. This will be understood when it is seen that the rod 39 and draw bar 29 swing on different pivots with rod 39 forcing slide 38 to compress spring 37 upon upward draw bar movement. This spring 37 which is in a natural unstrained state with the draw bar horizontal will also resist downward movement of the draw bar as downward draw bar movement will act to tension spring 37 and this resistance to the downward movement will be reinforced by the presence of the spring 45.

Thus, while the draw bar may move forcibly to accommodate for the height of the draft vehicle or for the inclination or angle of repose of the trailer body, the arrangement described will serve to effectively hold the frame 8 and the fifth wheel carried thereby in a substantially horizontal controlled position to prevent the dolly from falling down out of control during the operation of hitching or attaching same to the trailer body. This feature is of extreme importance in that it eliminates the danger and difficulty of handling dollies where the fifth wheel is tiltable on the dolly frame and where the dolly cannot be controlled through the draw bar.

Since the dollies provided for either end of the trailer body are identical the dollies can be attached to either trailer end and the connection between the king pin 3 and locking lever 14 and fifth wheel members 2 and 10 will permit the dolly to be rotated relative the trailer frame.

The provision of the incline ramp 12 and the arrangement for holding the draw bar in a semi-rigid condition greatly facilitates the attachment of the dolly to the trailer frame, as explained above. Thus the trailer with two identical dollies can be drawn from either end to eliminate the necessity of turning the trailer unit.

The dolly forming the support for the forward end of the trailer body, after the hitching or attaching operation, has the lock pin 42 removed from the end 40 of the rod 39 and the rod is allowed to drop as illustrated in Figure 3, thus permitting the draw bar to have free unobstructed hinging movement about the bolt 31 to enable the trailer unit to be readily drawn.

The dolly forming the support for the rear of the trailer body has the rod 39 disconnected from the frame 8 by removing the pin 42 and the draw bar is raised to a substantially vertical inoperative position, and the pin 42 is inserted back into the aligned opening 27 of the members 25, passing through an opening 46 provided in the draw bar to securely lock the draw bar in the inoperative position.

Next, the lock pin 6 is inserted into the opening 5 provided in the trailer body and is projected through the orifice 24 in the tongue 23 to lock the rear dolly against rotation relative the trailer frame. The trailer is then ready to be drawn by the draft vehicle which may be a truck tractor, a commercial or farm tractor, or other suitable vehicle.

While the rear dolly is normally held from rotation relative the trailer body by means of the pin 6, it will be understood that if the trailer is to be drawn around curves of exceedingly small radius the pin 6 can be removed to leave the rear dolly free to rotate about the vertical axis of the king pin 3.

It will thus be seen that the trailer body and the dolly structures for supporting same will be extremely practical, the trailer body being readily jacked or blocked up during the loading or unloading operation and the dollies quickly and safely removed for use with other trailer bodies, thus reducing to a minimum the investment tied up during the loading and unloading operations of the trailer unit.

In actual practice it has been found advisable to reinforce the dolly draw bar 29 and this is accomplished by means of tubular members 47 which are rigidly secured to the draw bar adjacent the forward end thereof and extend rearwardly and outwardly therefrom and are pivotally supported as at 48 in suitable pivot brackets 49 secured on the forward end of the frame 8 and spaced on either side of the members 25.

This arangement provides sufficient additional support for the draw bar, eliminating damage from severe lateral thrusts.

With the above arrangement in spotting the trailer body for loading, the body is generally jacked up and logs placed underneath to hold the body in the raised position and the dollies are removed.

To facilitate the spotting of the trailer body the dolly may be modified as illustrated in Figures 5, 6 and 7, in which the fifth wheel 10 is supported for vertical movement instead of being fixed to the dolly frame 8.

In the modified dolly arrangement the inclined ramps 12' extending rearwardly from the fifth wheel member 10 are hinged at their rearward ends at 50 to the dolly frame 8 and are hinged at their forward ends at 51 to the fifth wheel 10.

Secured on the underside of the fifth wheel 10 adjacent the forward edge thereof is an I-beam 52 extending transversely of the dolly frame 8, and pivotally secured in suitable pivotal brackets 53 arranged on the underside of the I-beam 52 in spaced relation are links 54 which extend rearwardly of the said I-beam and have their rearward ends 55 pivotally secured in pivot brackets 56 arranged on the dolly frame and rigidly secured thereto.

The links 54 and the hinged ramps are of corresponding lengths and swing in similar arcs above the fixed pivots 56 and 50 respectively to provide a parallel linkage system to enable the fifth wheel 10 to lift on a horizontal plane to the position illustrated in Figure 7. This arrangement allows the fifth wheel to be raised so that the top face thereof will remain completely in contact with the fifth wheel member 2 of the trailer body.

To accomplish the elevation of the fifth wheel 10 a hydraulic ram 57 is provided. This ram may be of any suitable type, either for use in conjunction with a hand-operated pump, or may be connected with the hydraulic system of the draft vehicle.

The upper end of the ram 57 is pivotally connected to the underside of the I-beam 52, as at 58, while the lower end of the ram is pivoted at 59 in a suitable rigid support 60 supported on or carried by the dolly frame 8.

Thus, to lift the loaded trailer unit so that the trailer frame or body 1 can be blocked up underneath, the hydraulic ram 57 is operated to raise the fifth wheel vertically, maintaining the upper face thereof in a horizontal plane and in contact with the face of the fifth wheel member 2 of the trailer body. Upon raising the fifth wheel 10 to the position of Figure 7 blocks or other suitable supports can be placed beneath the trailer body and the dolly detached from the trailer body.

With the provision of the elevatable fifth wheels on the dolly frame separate jacks do not have to be provided with the trailer body, and the trailer may be jacked up in remote areas where heavy-duty jacks would not be available.

It will readily be appreciated that the trailer equipment described will be extremely desirable, not only from the fact that the amount of equipment necessary in handling and maintaining trailer fleets will be kept to a minimum, reducing both the initial expense and maintenance costs, but in addition the reversibility of the trailer unit will be found extremely advantageous in hauling material over rough terrain and through the bush.

It will also be understood that our dolly construction for attachment to a trailer body will be extremely easy and safe to connect with the draw bar being maintained in a semi-rigid position during the attachment of the dolly to the trailer body to maintain the dolly under control, the inclined ramp arrangement and the fifth wheel members readily enabling the dolly to be backed into trailer-supporting position, and after connection the dolly draw bar can be adjusted for free hinging movement or it may be swung to and locked in an inoperative position, facilitating the convenience of handling the dolly.

The importance of providing an elevatable fifth wheel, as illustrated in the dolly structure shown in Figures 5, 6 and 7, will also be understood where it is desired to lift the loaded trailer.

While only one hydraulic ram is illustrated (57) for extremely heavy loads it may be advantageous to employ two or more of these rams with each dolly.

What we claim as our invention is:

1. A dolly for attachment to a trailer frame comprising a wheeled frame, a fifth wheel mounted on said wheeled frame, a draw bar hinged adjacent one end to said wheeled frame to extend forwardly thereof, a spring having one end fixedly secured in said draw bar, a slide slidable longitudinally of said draw bar and connected to the free end of said spring, a rod pivotally connected adjacent one end thereof to said slide, means for pivotally connecting the other end of said rod to said wheeled frame, said rod when pivotally connected to said wheeled frame forming with said spring a connection between said draw bar and wheeled frame resiliently maintaining said draw bar in a substantially horizontal position to facilitate attachment of said wheeled frame to said trailer frame.

2. A dolly as claimed in claim 1 in which said wheeled frame is formed with spaced projecting members having pivot openings and the means for pivotally connecting said rod to said wheeled frame comprises a removable pin passing through said pivot openings and said other end of said rod, said pin when removed permitting said draw bar unobstructed free hinging movement.

3. A dolly as claimed in claim 1 in which a second spring is secured to the underside of said wheeled frame and extends downwardly therefrom and adapted to engage the upper face of the end of said draw bar adjacent its hinge, said spring forming a resilient buffer to resist excessive downward movement of the forward end of the draw bar about its hinged support.

4. A dolly for attachment to a trailer frame, comprising a wheeled frame, a fifth wheel mounted on said wheeled frame, a hollow draw bar hinged to said wheeled frame to swing vertically and resilient releasable means adapted to firmly and resiliently maintain said draw bar in a substantially horizontal position against upward movement, said means comprising a coil spring arranged in said hollow draw bar and secured at one end thereof to said draw bar and constrained to axial movement only, a slide arranged in said hollow draw bar and secured to the other end of said spring and movable axially thereof, and a rigid connector pivoted at one end thereof to said slide and at the other end thereof adapted to be pivoted to said frame.

5. A dolly for attachment to a trailer frame, a wheeled frame, a hollow draw bar pivoted to said wheeled frame to swing vertically, a coil spring mounted within said hollow draw bar and aligned axially therewith and constrained thereby to axial movement only, said spring being fixed at one end to said draw bar, a slide arranged in said hollow draw bar and secured to the other end of said spring, and a rigid strut member pivoted at one end thereof to said slide and at the other end thereof adapted to be pivoted to said wheeled frame at a point displaced from the hinge of said draw bar to swing on an arc different from said draw bar.

6. A dolly for attachment to a trailer frame, comprising a wheeled frame, a hollow draw bar pivoted to said wheeled frame intermediate its length to project forwardly of said wheeled frame and to swing vertically, spring means engaging between said wheeled frame and the end of said draw bar rearwardly of its hinge urging said draw bar upwardly from a horizontal position, a coil spring axially arranged within said hollow draw bar and constrained thereby to axial movement only, said coil spring being fixed at one end thereof to said draw bar, a slide arranged within said hollow draw bar and secured to the other end of said coil spring, and a rigid strut member pivoted at one end thereof to said slide and at the other end thereof adapted to be pivoted to said wheeled frame to place said spring under compression upon upward movement of said draw bar from a horizontal position.

7. A detachable dolly for attachment to a trailer frame having a fifth wheel mounted thereon, comprising a wheeled frame, a fifth wheel mounted on said wheeled frame to co-operate with the fifth wheel carried by the trailer frame, a hollow draw bar hinged to said wheeled frame, a spring arranged within said draw bar, a rigid bar connected with the end of said spring and releasably connectable to said wheeled frame to resiliently maintain said draw bar in a substantially horizontal position during attachment of the wheeled frame to said trailer frame.

8. In a dolly for attachment to a trailer, a wheeled frame, a draw bar hinged to said wheeled frame, said draw bar comprising a pair of I-beams having the flanges thereof secured at the edges to form a hollow beam, said hollow beam having a longitudinal slot in the upper wall thereof, a stop plate rigidly secured in said hollow beam, a spring secured at one end to said stop plate, a slide slidably mounted within said draw bar secured to the opposite end of said spring, a rod pivotally secured adjacent one end to said slide and extending through said longitudinal slot, and means for pivotally securing the end of said rod remote from said slide to said wheeled frame.

9. A dolly for attachment to a trailer frame, comprising a wheeled frame, an elevatable fifth wheel, inclined ramps hinged adjacent one end in fixed pivots to said wheeled frame and hinged at the other end to one side of said elevatable fifth wheel, and link means hinged in fixed pivots on said wheeled frame and swingable parallel to said hinged ramps and pivotally connected to said fifth wheel on the side thereof remote from the side hinged to said ramps to permit said fifth wheel to move vertically, and means carried by said frame and connected to said fifth wheel to elevate said fifth wheel vertically as permitted by said hinged ramps and link means.

10. A device as claimed in claim 9 in which said means for elevating said fifth wheel comprises a hydraulic ram pivoted at one end thereof to said wheeled frame and at the other end thereof to said fifth wheel.

11. In combination a trailer frame having identical king pins and upper fifth wheel members arranged at each end thereof, and a pair of detachable, interchangeable dollies adapted to support said frame and having fifth wheels adapted to receive said king pins and to co-operate with said upper fifth wheel members carried by said trailer frame to permit said dollies to rotate about said king pins relative said frame, each of said dollies having a hollow draw bar hinged thereto to swing vertically for selective connection to a draft vehicle and having resilient releasable means for resiliently holding said draw bar in a substantially horizontal position against vertical displacement in either direction to facilitate the hitching of the dolly to said frame, said means including a connection between said draw bar and dolly comprising a longitudinal coil spring contained in said hollow draw bar against lateral displacement and secured at one end thereof to one end of said draw bar, a rigid connector pivotally connectable at one end thereof to said dolly, and means pivotally connecting the free ends of said spring and connector together, means for locking the dolly forming the support for the end of the trailer selected as the rearward end from rotation about its king pin relative the trailer frame, and means operable upon release of said resilient means to lock the draw bar of the dolly forming the support for the rearward end of the trailer frame in an inoperative position.

12. A detachable dolly for attachment to a trailer frame, comprising a wheeled frame, a plurality of sets of link means of substantially equal length pivoted to said wheeled frame, each set adapted to swing about parallel axes that are longitudinally spaced with the parallel axes of the sets being in turn parallel and spaced transversely of the axes, an elevatable fifth wheel having a horizontal trailer supporting surface pivoted to said link means and supported thereby for vertical movement while maintaining said trailer supporting surface horizontal, said fifth wheel being adapted to detachably co-operate with a fifth wheel member and a king pin carried by the trailer frame to provide a pivotal connection between said trailer frame and said wheeled frame to permit relative rotation therebetween, means for elevating said elevatable fifth wheel, a draw bar hinged to said wheeled frame, and means provided on said wheeled frame to enable same to be locked against rotation relative the trailer frame.

13. A dolly for attachment to a trailer frame comprising a wheeled frame, a plurality of horizontally separated link means of substantially equal length, each of said link means pivoted at one end thereof on said wheeled frame with the pivot axes of said link means parallel and at least some of the pivot axes being axially offset, an elevatable fifth wheel presenting a substantially horizontal trailer supporting surface pivoted to the free end of each of said link means and supported thereby for vertical movement on said wheeled frame while maintaining said surface substantially horizontal to co-operate with a fifth wheel member carried by said trailer frame, elevating means pivoted to said wheeled frame and to said elevatable fifth wheel, and a draw bar pivoted to said wheeled frame.

WILLIAM S. GURTON.
HERMAN NYBERG.

REFERENCES CITED

The following references are of record in the file of this patent:

UNITED STATES PATENTS

| Number | Name | Date |
|---|---|---|
| 406,373 | Sheets et al. | July 2, 1889 |
| 444,356 | Herby | Jan. 6, 1891 |
| 668,985 | Edwards | Feb. 26, 1901 |
| 1,540,502 | Schneider et al. | June 2, 1925 |
| 1,677,618 | Clement | July 17, 1928 |
| 1,862,574 | Kuhlman | June 14, 1932 |
| 2,041,124 | Francis | May 19, 1936 |
| 2,267,338 | Nugent | Dec. 23, 1941 |
| 2,369,384 | Zubatsky | Feb. 13, 1945 |
| 2,385,253 | Black | Sept. 18, 1945 |
| 2,407,447 | Pollard | Sept. 10, 1946 |
| 2,431,331 | Johnson | Nov. 25, 1947 |

FOREIGN PATENTS

| Number | Country | Date |
|---|---|---|
| 422,338 | Germany | Nov. 28, 1925 |